United States Patent
Hollifield

(10) Patent No.: US 10,272,784 B2
(45) Date of Patent: *Apr. 30, 2019

(54) SYSTEM AND METHOD FOR DISPLAY OF INFORMATION USING A VEHICLE-MOUNT COMPUTER

(71) Applicant: Hand Held Products, Inc., Fort Mill, SC (US)

(72) Inventor: Linda F. Hollifield, Duluth, GA (US)

(73) Assignee: HAND HELD PRODUCTS, INC., Fort Mill, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/624,084

(22) Filed: Jun. 15, 2017

(65) Prior Publication Data
US 2018/0001769 A1 Jan. 4, 2018

Related U.S. Application Data

(63) Continuation of application No. 14/571,358, filed on Dec. 16, 2014, now Pat. No. 9,682,625, which is a
(Continued)

(51) Int. Cl.
*B60R 16/023* (2006.01)
*B60K 35/00* (2006.01)
(Continued)

(52) U.S. Cl.
CPC ............. *B60K 35/00* (2013.01); *B60K 37/06* (2013.01); *B60R 1/00* (2013.01); *B60R 16/0231* (2013.01);
(Continued)

(58) Field of Classification Search
CPC ................... B60K 35/00; B60K 37/06; B60K 2350/1024; B60K 2350/106;
(Continued)

(56) References Cited

U.S. PATENT DOCUMENTS

| 4,821,029 A | 4/1989 | Logan et al. |
| 5,359,515 A | 10/1994 | Weller et al. |

(Continued)

FOREIGN PATENT DOCUMENTS

| EP | 0913802 A2 | 5/1999 |
| EP | 2805845 A2 | 11/2014 |

(Continued)

OTHER PUBLICATIONS

AVTech, Website at http://www.avtech.com.hk/eng/AVI321.htm; downloaded on Jun. 3, 2014; 1 page. Previously provided in parent application.

(Continued)

*Primary Examiner* — Gertrude Arthur Jeanglaude
(74) *Attorney, Agent, or Firm* — Additon, Higgins & Pendleton, P.A.

(57) ABSTRACT

A system and method displays information using a vehicle-mount computer. The system includes (i) an input device and a display device for inputting and displaying information; (ii) a motion detector for detecting vehicle motion; (iii) a proximity sensor for detecting proximity to an item; and (vi) a vehicle-mount computer in communication with the input device, the display device, the motion detector, and the proximity sensor, the vehicle-mount computer including a central processing unit and memory. The vehicle-mount computer's central processing unit is configured to store information associated with user-selected information from the input device and to display a zoomed view of the user-selected information on the display device. Further, the vehicle-mount computer's central processing unit is configured to override screen-blanking when user-selected information is displayed.

20 Claims, 4 Drawing Sheets

Related U.S. Application Data continuation of application No. 13/902,110, filed on May 24, 2013, now Pat. No. 8,918,250.

(51) Int. Cl.
  *B60K 37/06*  (2006.01)
  *B60R 1/00*  (2006.01)
  *G06F 3/03*  (2006.01)
  *G06F 3/0488*  (2013.01)

(52) U.S. Cl.
  CPC ............ *B60K 2350/1004* (2013.01); *B60K 2350/106* (2013.01); *B60K 2350/1024* (2013.01); *B60K 2350/962* (2013.01); *B60K 2350/967* (2013.01); *G06F 3/0312* (2013.01); *G06F 3/0488* (2013.01)

(58) Field of Classification Search
  CPC ........ B60K 2350/962; B60K 2350/967; B60R 1/00; B60R 16/0231; B60R 2350/1004; G06F 3/0312; G06F 3/0488
  USPC .................................................. 701/29.1, 36
  See application file for complete search history.

(56) References Cited

U.S. PATENT DOCUMENTS

| | | |
|---|---|---|
| 5,689,682 A | 11/1997 | Peasley et al. |
| 5,850,209 A | 12/1998 | Lemke et al. |
| 5,949,345 A | 9/1999 | Beckert et al. |
| 6,094,609 A | 7/2000 | Arjomand |
| 6,226,570 B1 | 5/2001 | Hahn |
| 6,574,531 B2 | 6/2003 | Tan et al. |
| 6,690,940 B1 | 2/2004 | Brown et al. |
| 6,832,725 B2 | 12/2004 | Gardiner et al. |
| 7,050,907 B1 | 5/2006 | Janky et al. |
| 7,082,365 B2 | 7/2006 | Sheha et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,489,303 B1 | 2/2009 | Pryor |
| 7,492,255 B1* | 2/2009 | Morris ................ B60R 25/1003 340/426.12 |
| 7,567,861 B2 | 7/2009 | Inagaki |
| 7,640,101 B2 | 12/2009 | Pair et al. |
| 7,726,575 B2 | 6/2010 | Wang et al. |
| 7,983,840 B2 | 7/2011 | Pair et al. |
| 8,077,143 B2 | 12/2011 | Panabaker et al. |
| 8,078,359 B2 | 12/2011 | Small et al. |
| 8,294,969 B2 | 10/2012 | Plesko |
| 8,317,105 B2 | 11/2012 | Kotlarsky et al. |
| 8,322,622 B2 | 12/2012 | Liu |
| 8,346,426 B1 | 1/2013 | Szybalski |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,514,172 B2 | 8/2013 | Panabaker et al. |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |

(56) References Cited

U.S. PATENT DOCUMENTS

| | | |
|---|---|---|
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |

(56) References Cited

U.S. PATENT DOCUMENTS

| | | |
|---|---|---|
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,682,625 B2 * | 6/2017 | Hollifield ............... B60K 35/00 |
| 9,697,401 B2 | 7/2017 | Feng et al. |
| 9,701,140 B1 | 7/2017 | Alaganchetty et al. |
| 2002/0085043 A1 | 7/2002 | Ribak |
| 2003/0125873 A1 | 7/2003 | Yamaguchi et al. |
| 2007/0063048 A1 | 3/2007 | Havens et al. |
| 2008/0211779 A1 | 9/2008 | Pryor |
| 2009/0085863 A1 | 4/2009 | Panabaker et al. |
| 2009/0134221 A1 | 5/2009 | Zhu et al. |
| 2010/0090816 A1 | 4/2010 | Hirsch et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0191457 A1 | 7/2010 | Harada |
| 2011/0001614 A1 | 1/2011 | Ghneim |
| 2011/0169999 A1 | 7/2011 | Grunow et al. |
| 2011/0202554 A1 | 8/2011 | Powilleit et al. |
| 2012/0062455 A1 | 3/2012 | Panabaker et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0242687 A1 | 9/2012 | Choi |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0168787 A1 | 6/2014 | Wang et al. |
| 2014/0175165 A1 | 6/2014 | Havens et al. |

(56) References Cited

U.S. PATENT DOCUMENTS

| | | |
|---|---|---|
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0220753 A1 | 8/2015 | Zhu et al. |
| 2015/0239348 A1 | 8/2015 | Chamberlin |
| 2015/0254485 A1 | 9/2015 | Feng et al. |
| 2015/0310243 A1 | 10/2015 | Ackley |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |

(56) References Cited

U.S. PATENT DOCUMENTS

| | | |
|---|---|---|
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschinie et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |

FOREIGN PATENT DOCUMENTS

| | | |
|---|---|---|
| GB | 2398050 A | 8/2004 |
| GB | 2490059 A | 10/2012 |
| GB | 2517824 A | 3/2015 |
| JP | H0950235 A | 2/1997 |
| WO | 9843192 A1 | 10/1998 |
| WO | 03057522 A1 | 7/2003 |
| WO | 2011140591 A1 | 11/2011 |
| WO | 2013163789 A1 | 11/2013 |
| WO | 2014058087 A1 | 4/2014 |

OTHER PUBLICATIONS

AVTech, "AVI311 PTZ Network Camera", Jan. 2, 2013, 2 pages. Previously provided in parent application.

Search Report in counterpart European Application No. 14160386.0 dated Jul. 31, 2015, pp. 1-3 Previously provided in parent application.

European Exam Report in related EP Application No. 14160386.0, dated Jul. 29, 2016, 5 pages Previously provided in parent application.

Great Britain Search and Exam Report in Application GB1408963.1; dated Dec. 3, 2014; 8 pages. Previously provided in Parent Application.

Great Britain Second Exam Report in Application GB1408963.1; dated Nov. 20, 2015; 3 pages. Previously provided in Parent Application.

\* cited by examiner

SYSTEM AND METHOD FOR DISPLAY OF INFORMATION USING A VEHICLE-MOUNT COMPUTER

CROSS-REFERENCE TO RELATED APPLICATION

The present application claims the benefit of U.S. patent application Ser. No. 14/571,358 for a System and Method for Display of Information Using a Vehicle-Mount Computer filed Dec. 16, 2014 (and published Apr. 9, 2015 as U.S. Patent Publication No. 2015/0100196), now U.S. Pat. No. 9,682,625, which claims the benefit of U.S. patent application Ser. No. 13/902,110 for a System and Method for Display of Information Using a Vehicle-Mount Computer filed May 24, 2013 (and published Nov. 27, 2014 as U.S. Patent Application Publication No. 2014/0350782), now U.S. Pat. No. 8,918,250. Each of the foregoing patent applications, patent publications, and patents is hereby incorporated by reference in its entirety.

FIELD OF THE INVENTION

The present invention relates generally to computer systems, and, more specifically, to systems and methods for displaying information using a vehicle-mount computer during vehicle motion.

BACKGROUND

Businesses have achieved greater productivity in recent years by deploying mobile computing devices into the field to assist workers. For example, workers use vehicle-mount computers to display important information in the field. Vehicle-mount computers are computing devices that are specially designed to mount to a vehicle and be used by the vehicle operator. For instance, several types of vehicle-mount computers are available for installation and use in commercial vehicles including forklifts, warehouse vehicles, cranes, and delivery trucks and vans.

Vehicle-mount computer systems typically utilize a screen for displaying information to a vehicle operator or other occupant. The computer system may incorporate a touch screen, or other input device, so that the user can select desired information for display. A forklift operator may, for example, view inventory information regarding shipped or inventoried products, location information regarding the next item to be loaded for shipping, and navigation information relating to the item to be loaded directly from the cabin of the forklift using a vehicle-mount computer. The various types of user-selected information may be displayed either individually on the full area of a vehicle-mount computer screen or simultaneously on the computer screen using split-screen or otherwise partitioned views.

For safety reasons, vehicle-mount computer systems may incorporate a screen blanking or lock-out feature to prevent a driver of a vehicle from viewing or otherwise interacting with the vehicle-mount computer system while the vehicle is in motion. To prevent distractions that may cause accidents, the blanking or lock-out feature may disable all aspects of the computer system preventing all interaction by the driver during vehicle motion, or otherwise during potential vehicle motion such as when the vehicle is put into gear. Disabling of the computer system or blanking the computer screen is undesirable, however, due to the fact that the driver is not able to access relevant information during vehicle motion, such as delivery information relating to an item.

Although businesses have effectively employed vehicle-mount computers to increase worker productivity and improve the inbound, internal, and outbound flow of resources, challenges exist relating to the safe and effective display of information on vehicle-mount computer screens when a vehicle, such as a forklift, is in motion or is potentially in motion. When a vehicle is in motion, the information displayed must be easily read by the vehicle operator at a glance so that the screen blanking safety feature becomes unnecessary. Moreover, when in motion the driver may prefer that only certain information be displayed on the vehicle-mount computer such as, for example, information relating to the next item that will be picked up.

Although a vehicle operator could potentially configure a vehicle-mount computer to display certain desired information prior to placing the vehicle in motion, the driver would then have to remember the relevant information during vehicle motion after the screen blanking feature or lock-out feature is engaged. This is particularly inefficient for industrial vehicles that are continually picking up and delivering items.

Therefore, a need exists for improved systems and methods for displaying information using a vehicle-mount computer so that the computer screen blanking feature is overridden and information of interest that has been selected by a driver will be automatically displayed during vehicle motion. More particularly, there exists a need for a system to (1) obtain and store user-selected information on a vehicle-mount computer screen; (2) bypass computer screen blanking; and (3) provide an easily-readable, centered and zoomed view of the selected information when the vehicle is in motion.

Further, there exists a need for improved systems and methods for displaying information using a vehicle-mount computer that are adaptive as to the information of interest selected by a driver. More particularly, there exists a need for systems and methods that can automatically display additional information associated with user-selected information that might be more relevant when the vehicle is in motion or otherwise at various locations in relation to the item of interest.

SUMMARY

Accordingly, in one aspect, the present invention embraces a system for displaying information using a vehicle-mount computer, including a computer touch screen for inputting and displaying information, a motion detector for detecting vehicle motion, and a vehicle-mount computer in communication with the computer touch screen and the motion detector, the vehicle-mount computer including a central processing unit and memory. The vehicle-mount computer's central processing unit is configured to store information associated with user-selected information from the computer touch screen, receive vehicle-motion information from the motion detector, control the display of user-selected information on the computer touch screen, and the vehicle-mount computer's central processing unit includes a blanking feature that blanks the computer touch screen in response to the motion detector's detection of motion unless the computer touch screen is displaying user-selected information.

In an exemplary embodiment, the vehicle-mount computer's central processing unit is configured to control the display of a zoomed view of the user selected information on the computer touch screen.

In another exemplary embodiment, the zoomed view covers at least about 50% of the display area of the computer touch screen.

In yet another exemplary embodiment, the vehicle-mount computer's central processing unit is configured to control the display of a zoomed view of the user selected information and additional information associated with the user-selected information on the computer touch screen in response to the motion detector's detection of motion.

In yet another exemplary embodiment, the user selected information displayed includes additional information associated with the user-selected information.

In yet another exemplary embodiment, the additional information associated with the user-selected information includes delivery navigation information.

In yet another exemplary embodiment, the additional information associated with the user-selected information includes information regarding an item for pickup.

In yet another exemplary embodiment, the item for pickup is a pallet of goods.

In yet another exemplary embodiment, the system includes a proximity sensor for detecting vehicle location, and the vehicle-mount computer's central processing unit is configured to receive vehicle-location information from the proximity sensor and in response to vehicle-location information, the central processing unit is configured to display on the computer touch screen additional information associated with the user selected information.

In yet another exemplary embodiment, the vehicle-mount computer includes a network interface.

In yet another exemplary embodiment, the vehicle-mount computer receives the additional information associated with the user selected information through the network interface.

In yet another exemplary embodiment, the user-selected information is within a user-selected area on the computer touch screen.

In yet another exemplary embodiment, the user-selected area includes a circle.

In yet another exemplary embodiment, the configuration of the user-selected area is predetermined by the vehicle-mount computer.

In yet another exemplary embodiment, the vehicle-mount computer includes a network interface.

In yet another exemplary embodiment, the motion detector includes an accelerometer, a gps locator, a gyroscope, and/or a compass.

In another aspect, the invention embraces a method for displaying data using a vehicle-mount computer, including monitoring vehicle motion with a motion detector, unless the computer touch screen is displaying user selected information, blanking the computer touch screen in response to the detection of vehicle motion, selecting user selected information on a computer touch screen of the vehicle-mount computer, and after the step of selecting user selected information, storing in the vehicle-mount computer the user selected information.

In an exemplary embodiment, the method includes displaying additional information associated with the user selected information on the computer touch screen display.

In another exemplary embodiment, the vehicle-mount computer includes a network interface.

In yet another aspect, the invention embraces a method for displaying data using a vehicle-mount computer including monitoring vehicle motion with a motion detector, unless the computer touch screen is displaying user selected information, blanking the computer touch screen in response to the detection of vehicle motion, selecting user selected information on a computer touch screen of the vehicle-mount computer, after the step of selecting user selected information, storing in the vehicle-mount computer the user selected information, monitoring vehicle proximity to a location with a proximity sensor, and after detecting vehicle proximity to a location, displaying additional information associated with the user-selected information on the computer touch screen in response to certain detected locations.

The foregoing, as well as other objectives and advantages of the invention, and the manner in which the same are accomplished, are further specified within the following detailed description and its accompanying drawings.

DETAILED DESCRIPTION

Figure 1:
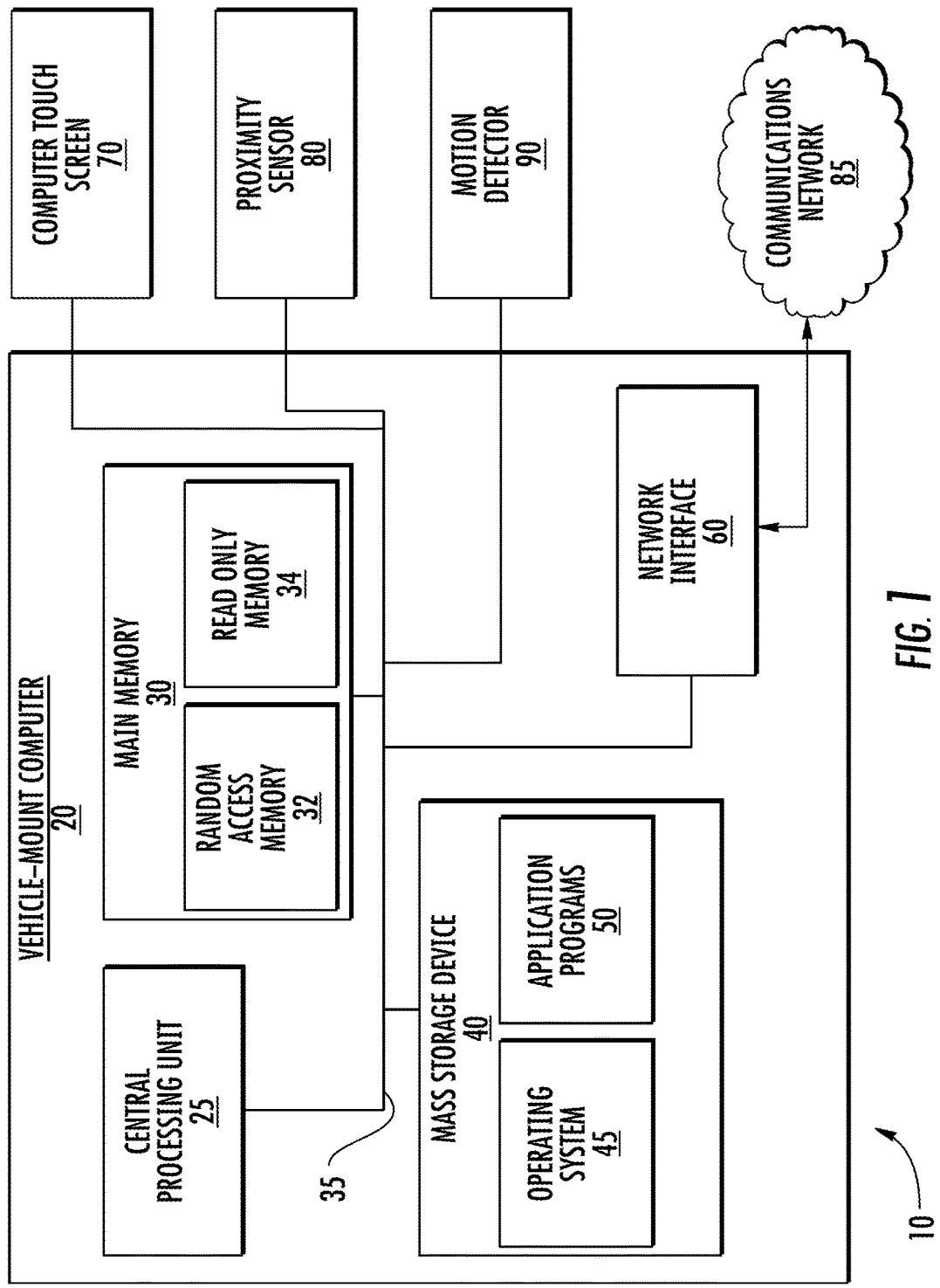
FIG. 1 is a schematic block diagram illustrating components for an exemplary system for displaying information using a vehicle-mount computer according to the present invention.

The present invention embraces systems and methods for displaying information. In particular, the present invention embraces systems and methods for displaying information using a vehicle-mount computer during vehicle motion.

In an exemplary embodiment, the system for displaying information using a vehicle-mount computer according to the present invention may include a vehicle-mount computer having a central processing unit, a system bus, a main memory, a mass storage device, an operating system stored on the mass storage device and executed by the central processing unit, and a computer touch screen for receiving input from a user and displaying information. The components of the vehicle-mount computer may be connected and in communication with each other by way of the system bus. The exemplary system may also include a motion detector connected to and in communication with the vehicle-mount computer. Moreover, the exemplary system could include a proximity sensor connected to and in communication with the vehicle-mount computer.

In another exemplary embodiment, the method for displaying information using a vehicle-mount computer according to the present invention includes providing a vehicle-mount computer having a central processing unit, a system bus, a main memory, a mass storage device, an operating system stored on the mass storage device and executed by the central processing unit, and a computer touch screen for receiving input from a user and displaying information. The exemplary method according to the present invention may further include the steps of connecting a motion detector to the vehicle-mount computer for detecting vehicle motion. The exemplary method according to the present invention may further include the steps of displaying a zoomed view of user-selected information on the computer touch screen. Further, the exemplary method according to the present invention may include the step of overriding lock-out or screen blanking during vehicle motion.

In yet another exemplary embodiment, the method for displaying information using a vehicle-mount computer according to the present invention may include providing a vehicle-mount computer having a central processing unit, a system bus, a main memory, a mass storage device, an operating system stored on the mass storage device and executed by the central processing unit, and a computer touch screen for receiving input from a user and displaying information. The exemplary method according to the present invention may further include the steps of connecting a motion detector to the vehicle-mount computer for detecting vehicle motion and a proximity sensor for detecting vehicle location in relation to items of interest. The exemplary method may further include the steps of displaying a zoomed view of user-selected information on the computer touch screen and overriding screen-blanking upon the detection of vehicle motion. The exemplary method may also include the steps of, upon the motion detector's detection of vehicle motion or the proximity sensor's detection of certain specified locations, displaying additional information relating to the user-selected items of interest.

Non-limiting examples of typical vehicles that may employ the system and method for displaying information using a vehicle-mount computer according to the present invention include forklifts, cranes, delivery trucks and similar industrial vehicles (e.g., vehicles used in industrial operations, factory or warehouse settings, and the like). References in the disclosure to particular types of vehicles are not intended to limit the disclosure to particular vehicles.

Referring now to the drawings, FIG. 1 is a schematic block diagram illustrating components of an exemplary system 10 for displaying information using a vehicle-mount computer. Vehicle-mount computer 20 includes a mass storage device 40 for storing an operating system 45 and various application programs 50. The mass storage device 40 may store other types of information as well.

As illustrated in FIG. 1, operating system 45 of the exemplary embodiment consists of software that controls the overall operation of the vehicle-mount computer 20, including process scheduling and management, process protection, and memory management. Examples of suitable operating systems include, but are not limited to, WINDOWS® 7 and WINDOWS® EMBEDDED COMPACT (i.e., WINDOWS® CE) from MICROSOFT® CORPORATION of Redmond, Wash., and the LINUX® open source operating system. Typically, operating system 45 is loaded by booting the vehicle-mount computer 20 and is executed directly by the central processing unit 25.

Application programs 50 (FIG. 1) include any number of executable software programs designed to assist the vehicle operator in the performance of specific tasks. Application programs 50 may load automatically upon execution of operating system 45 or in response to an input from the vehicle operator.

Main memory 30 (FIG. 1) provides for storage of instructions and information directly accessible by central processing unit 25. Main memory 30 may be configured to include random-access memory 32 (RAM) and read-only memory 34 (ROM). The ROM 34 may permanently store firmware or a basic input/output system (BIOS), which provides first instructions to vehicle-mount computer 20 when it is booted. RAM 32 may serve as temporary and immediately accessible storage for operating system 45 and application programs 50.

Mass storage device 40 (FIG. 1) may be any of the various types of computer components capable of storing large amounts of data in a persisting (i.e., non-volatile) and machine-readable manner. Typically, mass storage device 40 may be a hard disk drive. Alternatively, mass storage device 40 may be a solid state drive, optical drive, removable flash drive or any other component with similar storage capabilities.

As illustrated in FIG. 1, computer touch screen 70 may be provided for inputting and displaying information using vehicle-mount computer 20. Computer touch screen 70 is operably connected to, and in communication with, vehicle-mount computer 20. Touch screen 70 may display information to users in the form of text or graphical output generated by vehicle-mount computer 20. Persons having skill in the art will appreciate that computer touch screen 70 may incorporate any appropriate touch screen technology having the ability to sense touch (e.g., resistive, capacitive, etc.) and that is conducive to the operating environment of the vehicle. Although touch screen 70 is illustrated in FIG. 1, other input devices (e.g., keyboard or mouse) or display devices may be utilized in connection with vehicle-mount computer 20.

As depicted in FIG. 1, an exemplary embodiment of the vehicle-mount computer 20 of the system 10 for displaying information using a vehicle-mount computer may also include network interface 60. Network interface 60 is operably connected to communications network 85, enabling vehicle-mount computer 20 to communicate with communications network 85. Communications network 85 may include any collection of computers or communication devices interconnected by communication channels. The communication channels may be wired or wireless. Examples of such communication networks include, without limitation, local area networks, the Internet, and cellular networks. The connection to communications network 85 allows vehicle-mount computer 20 to communicate with other network nodes. For example, a central dispatcher could send instructions (e.g., a delivery schedule for pickup and drop off) from a scheduling server to the vehicle operator via communications network 85.

Motion detector 90 (FIG. 1) may include any number of sensors or other appropriate devices that detect vehicle movement or potential vehicle movement. Motion detector 90 is operably connected to and in communication with vehicle-mount computer 20. Those having skill in the art will appreciate that any of a number of sensors may be utilized to detect vehicle movement including, but not limited to, an accelerometer, gps locator, gyroscope, compass, or some appropriate combination of a number of sensors or devices. Sensors could also monitor potential vehicle movement, such as when the vehicle is placed into gear or otherwise made ready for movement by the user. As the term is used herein, vehicle motion specifically embraces the concept of actual motion as well as potential motion.

As depicted in FIG. 1, an exemplary embodiment of the vehicle-mount computer 20 of the system 10 for displaying information using a vehicle-mount computer may also include proximity sensor 80. Proximity sensor 80 may be operably connected to and in communication with vehicle-mount computer 20. Those having skill in the art will appreciate that any of a number of sensors may be utilized to detect vehicle proximity to a selected item or location including, but not limited to, a gps locator and/or some appropriate combination of other sensors or devices. Thus, in some embodiments, the motion detector 90 could operate as a proximity sensor 80, or the elements may be combined as to their use of certain sensors to perform their functions.

Central processing unit 25 is configured to store information associated with user-selected information within a user-selected area from the computer touch screen 70. As illustrated in the exemplary embodiment (FIG. 1), the central processing unit 25 may execute application programs 50 to at least temporarily store information relating to user-selected information within a user-selected area, such as a circle, input from computer touch screen 70.

Figure 2:
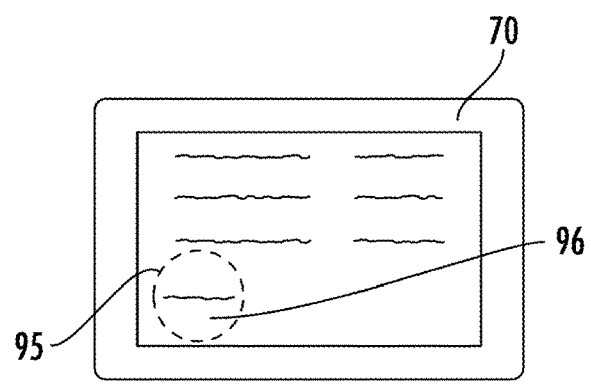
FIG. 2 illustrates exemplary user-selected information within a user-selected area from a computer touch screen according to the present invention.

As illustrated in FIG. 2, the vehicle-mount computer's 20 central processing unit 25, along with other components of system 10, such as application programs 50, may be configured to store user-selected information 96 associated with a user-selected area 95 from computer touch screen 70. Although the user-selected area 95, as depicted in FIG. 2, consists of a circle, the user-selected area 95 could consist of any configuration.

Figure 3:
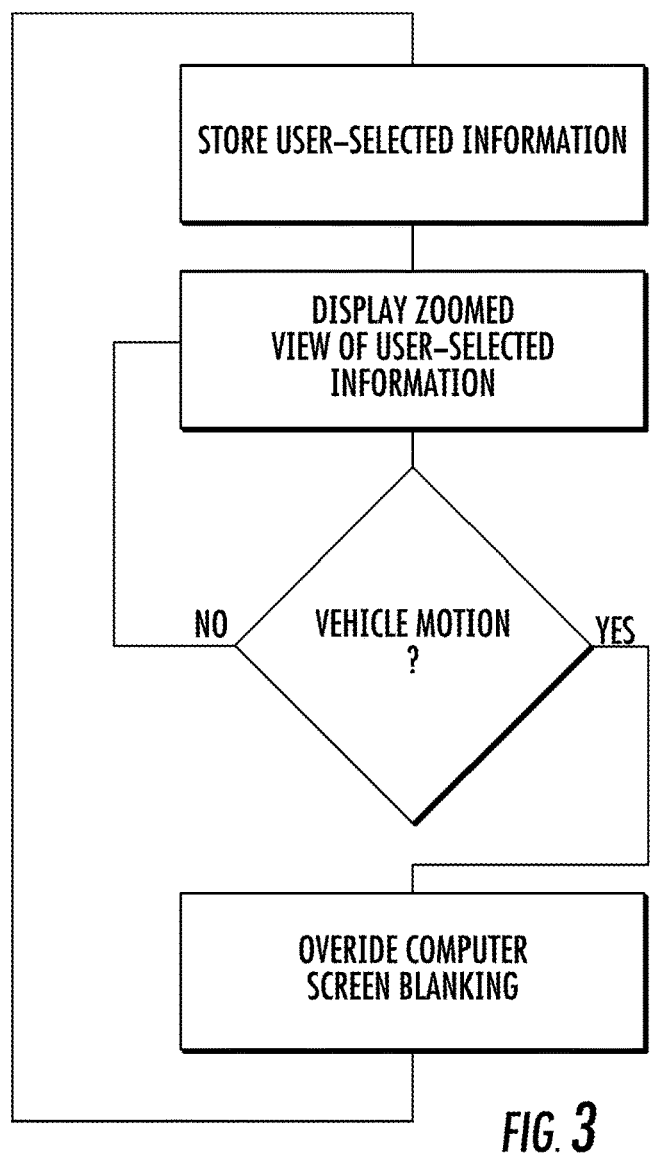
FIG. 3 illustrates the communication of certain elements of the exemplary embodiment for using a vehicle-mount computer according to the present invention.

FIG. 3 illustrates how certain of the above described elements of the exemplary system 10 for displaying information using a vehicle-mount computer may communicate in order to display user-selected information. As set forth above, the vehicle-mount computer's 20 central processing unit 25 is configured to receive vehicle-motion information from motion detector 90. The vehicle-mount computer's 20 central processing unit 25 is configured to disable or override computer lock-out or screen-blanking when user-selected information 96 has been selected and stored. Computer lock-out, or screen blanking, is a security feature that may otherwise be triggered by vehicle motion or potential vehicle motion. The vehicle-mount computer's 20 central processing unit 25 is further configured to control the storage and display of a zoomed view 100 (FIG. 4) of the user-selected information 96 on the computer touch screen 70 in response to the motion detector's 70 detection of vehicle motion.

Figure 4:
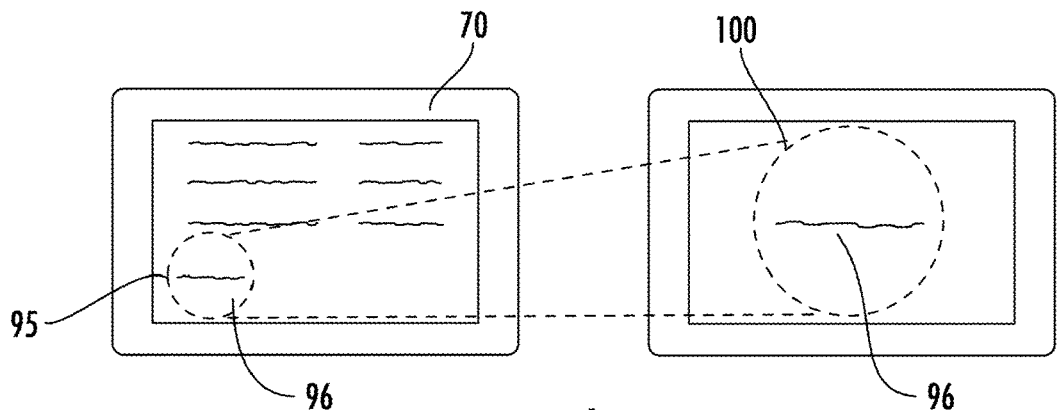
FIG. 4 depicts exemplary user-selected information according to the present invention being displayed in a zoomed view on the vehicle-mount computer during vehicle motion.

As illustrated in FIG. 4, the user-selected information 96 within user-selected area 95 may include information on the computer touch screen 70 that the vehicle operator prefers be displayed in a zoomed view 100 on the vehicle-mount computer 20 during vehicle motion. Such information may include, but is not limited to, a particular pallet or other item that is scheduled for pickup or delivery. As set forth in FIG. 4 and described above, computer screen blanking will be bypassed and the user-selected information 96 within user-selected area 95 will be displayed on the computer touch screen 70 during vehicle motion or potential vehicle motion. More particularly, the user-selected information 96 will be displayed in a zoomed view 100 (i.e., a magnified view) on the vehicle-mount computer 20 such that the user-selected area 95 is provided in a more easily-readable format when the vehicle is in motion.

Figure 5:
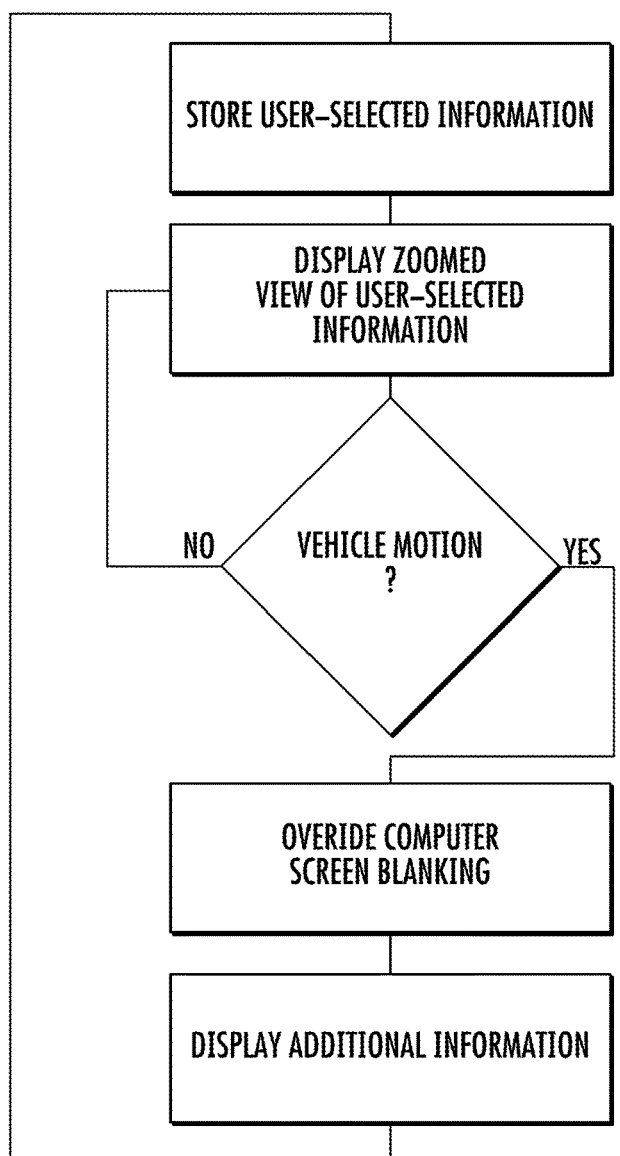
FIG. 5 illustrates the communication of certain elements of the exemplary embodiment for using a vehicle-mount computer according to the present invention.

FIG. 5 illustrates how certain of the above described elements of another exemplary system 10 for displaying information using a vehicle-mount computer may communicate in order to display user-selected information. The vehicle-mount computer's 20 central processing unit 25 is configured to control the storage and display of a zoomed view 100 of user-selected information 96 within user-selected area 95 on the computer touch screen 70. The vehicle-mount computer's 20 central processing unit 25 is configured to receive vehicle-motion information from motion detector 90. The vehicle-mount computer's 20 central processing unit 25 is also configured to disable or override computer lock-out or screen-blanking when user-selected information 96 has been selected, stored, and displayed. Additionally, as depicted in FIG. 6, vehicle-mount computer's 20 central processing unit 25 may be configured when the vehicle is moving to display additional associated information 105 that is relevant to, or more relevant than, the user-selected information 96 when the vehicle is in motion.

Figure 6:
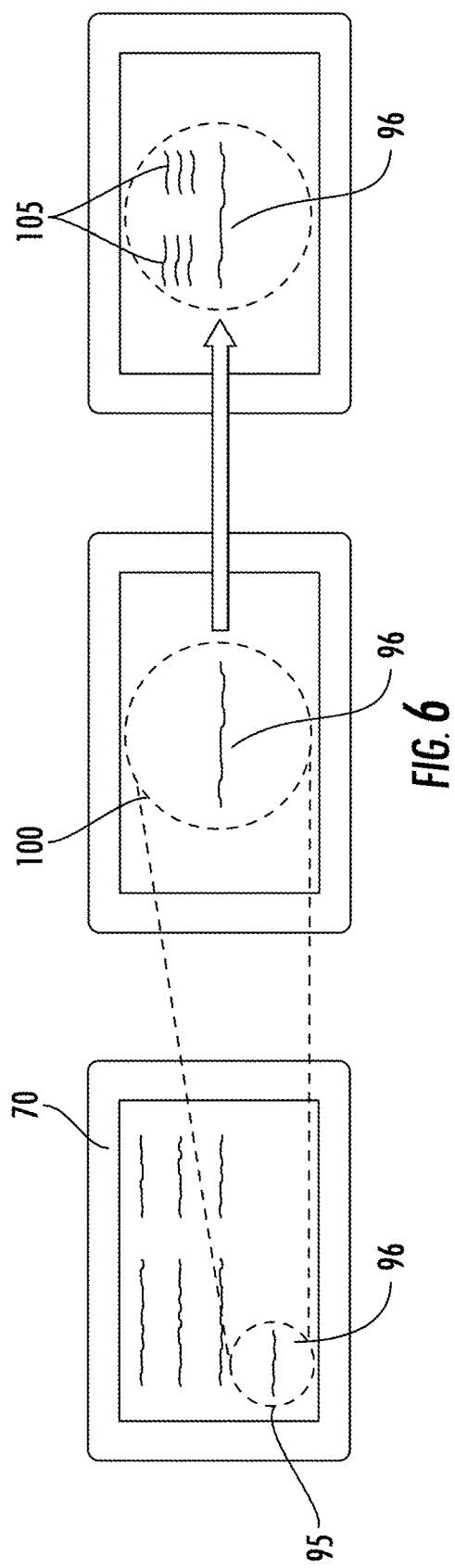
FIG. 6 depicts additional information related to exemplary user-selected information according to the present invention being displayed on the vehicle-mount computer during vehicle motion or potential vehicle motion.

As a non-limiting example, and as illustrated in FIG. 6, the user-selected information 96 that is displayed in a zoomed view 100 may be information relating to a specific pallet or item that is to be picked up by a vehicle driver. When the vehicle moves, the information on the computer screen 70 could be changed or supplemented to display more relevant additional information 105, including but not limited to information such as the location of the pallet to be picked up. Through communication of the sensors in communication with the vehicle-mount computer 20 (i.e., the sensors of proximity sensor 80 and/or motion detector 90), when the vehicle arrives within a certain distance from the item, the computer screen 70 could display other relevant information, such as a waypoint along the travel path. The computer screen 70 could also, for example, switch back to the originally zoomed view 100 when the vehicle operator arrived within a certain distance from the item.

In a non-limiting embodiment, the communications network 85, in communication with the network interface 60, central processing unit 25, and/or other appropriate elements of the system 10, may facilitate the transmission of instructions such as a pick up or delivery schedule as well as relevant additional information 105 relating to the item listed on the schedule and that may be displayed on the computer touch screen 70.

To supplement the present disclosure, this application incorporates entirely by reference the following patents, patent application publications, and patent applications: U.S. Pat. No. 6,832,725; U.S. Pat. No. 7,159,783; U.S. Pat. No. 7,413,127; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/

0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); and U.S. patent application Ser. No. 13/897,634 for a Laser Scanning Code Symbol Reading System Employing Programmable Decode Time-Window Filtering, filed May 20, 2013 (Wilz, Sr. et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A system comprising:
 a memory;
 an input unit;
 a display unit;
 a motion detector;
 a processing unit coupled to the memory, the input unit, the display unit, and the motion detector, wherein the processing unit is configured to:
  store user-selected information corresponding to information selected by a user via the input unit from amongst items displayed on the display unit and wherein the user-selected information is indicative of the information to be displayed on the display unit when the motion detector detects a motion;
  access motion information from the motion detector;
  identify, upon accessing motion information, no user-selected information being stored in the memory and based on the identification control the display unit to blank all of the items to be displayed on the display unit; and
  determine, upon accessing motion information, the user-selected information being stored in the memory and based on the determination control the display unit to override blanking of the all the items on the display unit and display user-selected information on the display unit.

2. The system of claim 1, wherein the processing unit is configured to control the display unit for displaying a zoomed view of the user-selected information.

3. The system of claim 2, wherein the zoomed view covers at least about 50% of display area of the display unit.

4. The system of claim 2, wherein the processing unit is configured to control the display unit for displaying a zoomed view of the user-selected information and additional information associated with the user-selected information in response to detection of motion by the motion detector.

5. The system of claim 1, wherein the user-selected information is one of: a navigational aid, an assistive information corresponding to picking of an item, and a zoomed view of textual information to be displayed on the display unit when the motion detector detects the motion.

6. The system of claim 1, comprising a proximity sensor; wherein the processing unit is configured to receive location information from the proximity sensor; and wherein, in response to location information, the processing unit is configured to display on the display device additional information associated with the user-selected information.

7. The system of claim 1, wherein the user-selected information is within a user-selected area on the display unit and wherein the user-selected area comprises any one of a circle and a rectangle encompassing information to be displayed on the display unit.

8. The system of claim 1, wherein configuration of the display unit for the user-selected area is predetermined by the processing unit.

9. The system of claim 1, wherein the motion detector comprises an accelerometer, a gps locator, a gyroscope, and/or a compass.

10. A method comprising:
monitoring motion associated with one of a computing system and a vehicle with a motion detector;
determining an availability of user-selected information corresponds to information selected by a user, the information from amongst items to be displayed on a display unit and wherein the user-selected information is indicative of the information to be displayed on the display unit when the motion detector detects a motion;
blanking all the items to be displayed on the display unit in response to the detection of motion if the user-selected information is determined to be not available;
overriding blanking all of the items to be displayed on the display unit and displaying the user-selected information in response to the detection of motion if the user-selected information is determined to be available.

11. The method of claim 10, comprising displaying one of: a navigational aid, an assistive information corresponding to picking of an item, and a zoomed view of textual information to be displayed on the display unit when the motion detector detects the motion.

12. The method of claim 10, comprising supplementing information displayed on the display unit with additional information, based on the detection of the motion by the motion detector.

13. The method of claim 10, comprising selecting an area on the display unit for providing the user-selected information and wherein the provided user-selected information is to be displayed in a zoomed view on the display unit upon detection of the motion by the motion detector.

14. The method of claim 10, comprising:
receiving, from a proximity sensor, location information corresponding to an object; and
displaying, in response to location information, on the display device additional information associated with the user-selected information.

15. A non-transient computer readable medium comprising instructions executable by a processing unit to perform the steps of:
monitoring motion associated with a computing system by a motion detector;
determining an availability of user-selected information corresponding to information selected by a user, the information from amongst items to be displayed on a display unit and wherein the user-selected information is indicative of the information to be displayed on the display unit when the motion detector detects a motion;
blanking all the items to be displayed on the display unit in response to the detection of motion if the user-selected information is determined to be not available;
overriding blanking of all the items to be displayed on the display unit and displaying the user-selected information in response to the detection of motion if the user-selected information is determined to be available.

16. The non-transient computer readable medium of claim 15, comprising instructions executable by the processing unit for displaying one of: a navigational aid, an assistive information corresponding to picking of an item, and a zoomed view of information to be displayed on the display unit when the motion detector detects the motion.

17. The non-transient computer readable medium of claim 15, comprising instructions executable by the processing unit for supplementing information displayed on the display unit with additional information based on the detection of the motion by the motion detector.

18. The non-transient computer readable medium of claim 15, comprising instructions executable by the processing unit for selecting an area on the display unit for providing the user-selected information and wherein the provided user-selected information is to be displayed in a zoomed view on the display unit upon detection of the motion by the motion detector.

19. The non-transient computer readable medium of claim 15, comprising instructions for:
receiving from a proximity sensor, location information corresponding to an object; and
displaying, in response to location information, on the display device additional information associated with the user-selected information.

20. The non-transient computer readable medium of claim 15, comprising instructions for displaying a zoomed view of the user-selected information on the display unit in response to the detection of the motion if the user-selected information is determined to be available.

* * * * *